(12) United States Patent
Gossain

(10) Patent No.: US 12,164,362 B2
(45) Date of Patent: Dec. 10, 2024

(54) SYNCHRONOUS PLAYBACK WITH BATTERY-POWERED PLAYBACK DEVICE

(71) Applicant: Sonos, Inc., Santa Barbara, CA (US)

(72) Inventor: Hrishikesh Gossain, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/147,989

(22) Filed: Dec. 29, 2022

(65) Prior Publication Data

US 2023/0288978 A1    Sep. 14, 2023

Related U.S. Application Data

(63) Continuation of application No. 17/129,435, filed on Dec. 21, 2020, now Pat. No. 11,543,876, which is a
(Continued)

(51) Int. Cl.
  *G06F 1/00*    (2006.01)
  *G05B 15/02*   (2006.01)
  (Continued)

(52) U.S. Cl.
  CPC ........... *G06F 1/3287* (2013.01); *G05B 15/02* (2013.01); *G06F 1/263* (2013.01); *G06F 1/3212* (2013.01);
  (Continued)

(58) Field of Classification Search
  CPC ...... G06F 1/3287; G06F 1/263; G06F 1/3212; G06F 1/3234; G06F 3/165; G06F 1/3209;
  (Continued)

(56) References Cited

U.S. PATENT DOCUMENTS

| 4,296,278 A | 10/1981 | Cullison et al. |
| 4,816,989 A | 3/1989 | Finn et al. |
| (Continued) |

FOREIGN PATENT DOCUMENTS

| CN | 101176363 A | 5/2008 |
| EP | 0251584 A2 | 1/1988 |
| (Continued) |

OTHER PUBLICATIONS

Akyildiz et al., "Multimedia Group Synchronization Protocols for Integrated Services Networks," IEEE Journal on Selected Areas in Communications, 1996 pp. 162-173, vol. 14, No. 1.
(Continued)

*Primary Examiner* — Volvick Derose

(57) ABSTRACT

Example techniques related to battery-powered playback devices. In an example, a first battery-powered playback device (i) receives audio content from a network device, (ii) forwards the audio content to a second playback device for synchronous playback of the audio content with the second playback device, (iii) plays back the audio content, (iv) detects that a battery level of a battery of the first playback device has fallen below a predefined threshold, and (v) ceases the forwarding of the audio content. After the battery level of the first playback device has fallen below the predefined threshold, the second playback device (i) receives the audio content from the network device, (ii) forwards the audio content to the first playback device for synchronous playback with the first playback device, and (iii) plays back the audio content in synchrony with the first playback device.

20 Claims, 11 Drawing Sheets

Related U.S. Application Data continuation of application No. 15/999,382, filed on Aug. 20, 2018, now Pat. No. 10,871,817, which is a continuation of application No. 14/940,490, filed on Nov. 13, 2015, now Pat. No. 10,055,003, which is a continuation of application No. 14/042,072, filed on Sep. 30, 2013, now abandoned.

(51) Int. Cl.

| | |
|---|---|
| *G06F 1/26* | (2006.01) |
| *G06F 1/3212* | (2019.01) |
| *G06F 1/3234* | (2019.01) |
| *G06F 1/3287* | (2019.01) |
| *G06F 3/16* | (2006.01) |
| *H04L 47/33* | (2022.01) |
| *H04N 21/436* | (2011.01) |
| *H04N 21/442* | (2011.01) |
| *H04N 21/443* | (2011.01) |
| *H04W 52/02* | (2009.01) |
| *G06F 1/3203* | (2019.01) |
| *G06F 1/3209* | (2019.01) |
| *H04L 12/10* | (2006.01) |

(52) U.S. Cl.
CPC .......... *G06F 1/3234* (2013.01); *G06F 3/165* (2013.01); *H04L 47/33* (2013.01); *H04N 21/43615* (2013.01); *H04N 21/4424* (2013.01); *H04N 21/4436* (2013.01); *H04W 52/0251* (2013.01); *H04W 52/0277* (2013.01); *G06F 1/3203* (2013.01); *G06F 1/3209* (2013.01); *H04L 12/10* (2013.01); *Y02D 30/70* (2020.08)

(58) Field of Classification Search
CPC .. H04L 47/33; G05B 15/02; H04N 21/43615; H04N 21/4424; H04N 21/4436; H04W 52/0251; H04W 52/0277; Y02D 70/044; Y02B 60/50
USPC .......................................................... 713/323
See application file for complete search history.

(56) References Cited

U.S. PATENT DOCUMENTS

| | | | |
|---|---|---|---|
| 5,182,552 | A | 1/1993 | Paynting |
| 5,406,634 | A | 4/1995 | Anderson et al. |
| 5,440,644 | A | 8/1995 | Farinelli et al. |
| 5,467,342 | A | 11/1995 | Logston et al. |
| 5,491,839 | A | 2/1996 | Schotz |
| 5,553,222 | A | 9/1996 | Milne et al. |
| 5,668,884 | A | 9/1997 | Clair, Jr. et al. |
| 5,673,323 | A | 9/1997 | Schotz et al. |
| 5,761,320 | A | 6/1998 | Farinelli et al. |
| 5,815,689 | A | 9/1998 | Shaw et al. |
| 5,867,691 | A | 2/1999 | Shiraishi |
| 5,875,354 | A | 2/1999 | Charlton et al. |
| 5,887,143 | A | 3/1999 | Saito et al. |
| 5,923,902 | A | 7/1999 | Inagaki |
| 5,946,343 | A | 8/1999 | Schotz et al. |
| 6,009,457 | A | 12/1999 | Moller |
| 6,026,150 | A | 2/2000 | Frank et al. |
| 6,031,818 | A | 2/2000 | Lo et al. |
| 6,032,202 | A | 2/2000 | Lea et al. |
| 6,128,318 | A | 10/2000 | Sato |
| 6,157,957 | A | 12/2000 | Berthaud |
| 6,175,872 | B1 | 1/2001 | Neumann et al. |
| 6,185,737 | B1 | 2/2001 | Northcutt et al. |
| 6,195,436 | B1 | 2/2001 | Scibora et al. |
| 6,199,169 | B1 | 3/2001 | Voth |
| 6,256,554 | B1 | 7/2001 | DiLorenzo |
| 6,308,207 | B1 | 10/2001 | Tseng et al. |
| 6,324,586 | B1 | 11/2001 | Johnson |
| 6,332,147 | B1 | 12/2001 | Moran et al. |
| 6,351,821 | B1 | 2/2002 | Voth |
| 6,404,811 | B1 | 6/2002 | Cvetko et al. |
| 6,430,353 | B1 | 8/2002 | Honda et al. |
| 6,469,633 | B1 | 10/2002 | Wachter |
| 6,487,296 | B1 | 11/2002 | Allen et al. |
| 6,522,886 | B1 | 2/2003 | Youngs et al. |
| 6,526,325 | B1 | 2/2003 | Sussman et al. |
| 6,587,127 | B1 | 7/2003 | Leeke et al. |
| 6,598,172 | B1 | 7/2003 | Vandeusen et al. |
| 6,611,537 | B1 | 8/2003 | Edens et al. |
| 6,631,410 | B1 | 10/2003 | Kowalski et al. |
| 6,674,803 | B1 | 1/2004 | Kesselring |
| 6,757,517 | B2 | 6/2004 | Chang |
| 6,778,869 | B2 | 8/2004 | Champion |
| 6,801,529 | B1 | 10/2004 | McGrane et al. |
| 6,826,283 | B1 | 11/2004 | Wheeler et al. |
| 6,836,788 | B2 | 12/2004 | Kim et al. |
| 6,898,642 | B2 | 5/2005 | Chafle et al. |
| 6,912,610 | B2 | 6/2005 | Spencer |
| 6,920,373 | B2 | 7/2005 | Xi et al. |
| 6,934,766 | B1 | 8/2005 | Russell |
| 6,985,694 | B1 | 1/2006 | De Bonet et al. |
| 7,007,106 | B1 | 2/2006 | Flood et al. |
| 7,020,791 | B1 | 3/2006 | Aweya et al. |
| 7,043,651 | B2 | 5/2006 | Aweya et al. |
| 7,047,308 | B2 | 5/2006 | Deshpande |
| 7,115,017 | B1 | 10/2006 | Laursen et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,162,315 | B2 | 1/2007 | Gilbert |
| 7,185,090 | B2 | 2/2007 | Kowalski et al. |
| 7,187,947 | B1 | 3/2007 | White et al. |
| 7,206,367 | B1 | 4/2007 | Moore |
| 7,209,795 | B2 | 4/2007 | Sullivan et al. |
| 7,236,773 | B2 | 6/2007 | Thomas |
| 7,295,548 | B2 | 11/2007 | Blank et al. |
| 7,312,785 | B2 | 12/2007 | Tsuk et al. |
| 7,324,857 | B2 | 1/2008 | Goddard |
| 7,333,519 | B2 | 2/2008 | Sullivan et al. |
| 7,372,846 | B2 | 5/2008 | Zwack |
| 7,391,791 | B2 | 6/2008 | Balassanian et al. |
| 7,392,102 | B2 | 6/2008 | Sullivan et al. |
| 7,483,538 | B2 | 1/2009 | McCarty et al. |
| 7,571,014 | B1 | 8/2009 | Lambourne et al. |
| 7,627,696 | B2 * | 12/2009 | Suematsu ............... G06F 1/266 320/132 |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,675,943 | B2 | 3/2010 | Mosig et al. |
| 7,720,096 | B2 | 5/2010 | Klemets |
| 7,742,740 | B2 | 6/2010 | Goldberg et al. |
| 7,853,341 | B2 | 12/2010 | McCarty et al. |
| 7,934,239 | B1 | 4/2011 | Dagman |
| 7,949,727 | B2 | 5/2011 | Jensen |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,050,652 | B2 | 11/2011 | Qureshey et al. |
| 8,074,253 | B1 | 12/2011 | Nathan |
| 8,086,752 | B2 | 12/2011 | Millington et al. |
| 8,095,120 | B1 * | 1/2012 | Blair ..................... H04M 3/562 455/518 |
| 8,103,009 | B2 | 1/2012 | McCarty et al. |
| 8,131,390 | B2 | 3/2012 | Braithwaite et al. |
| 8,180,407 | B1 * | 5/2012 | Kindred ............ H04W 52/0251 327/544 |
| 8,234,395 | B2 | 7/2012 | Millington |
| 8,370,678 | B2 | 2/2013 | Millington et al. |
| 8,423,659 | B2 | 4/2013 | Millington |
| 8,443,063 | B1 * | 5/2013 | Nelson .................. H04W 48/00 709/228 |
| 8,483,853 | B1 | 7/2013 | Lambourne |
| 8,538,564 | B2 | 9/2013 | Almstrand et al. |
| 8,572,224 | B2 | 10/2013 | Hite et al. |
| 8,942,252 | B2 | 1/2015 | Balassanian et al. |

(56) References Cited

U.S. PATENT DOCUMENTS

| | | | |
|---|---|---|---|
| 9,019,113 B2* | 4/2015 | Groth | G01R 31/50 |
| | | | 340/568.1 |
| 9,179,197 B2 | 11/2015 | Beckhardt et al. | |
| 9,444,565 B1* | 9/2016 | Leopardi | H04L 65/612 |
| 9,521,074 B2 | 12/2016 | Peters et al. | |
| 2001/0009604 A1 | 7/2001 | Ando et al. | |
| 2001/0022823 A1 | 9/2001 | Renaud | |
| 2001/0032188 A1 | 10/2001 | Miyabe et al. | |
| 2001/0042107 A1 | 11/2001 | Palm | |
| 2002/0002039 A1 | 1/2002 | Qureshey et al. | |
| 2002/0002562 A1 | 1/2002 | Moran et al. | |
| 2002/0022453 A1 | 2/2002 | Balog et al. | |
| 2002/0026442 A1 | 2/2002 | Lipscomb et al. | |
| 2002/0034374 A1 | 3/2002 | Barton | |
| 2002/0042844 A1 | 4/2002 | Chiazzese | |
| 2002/0065926 A1 | 5/2002 | Hackney et al. | |
| 2002/0073228 A1 | 6/2002 | Cognet et al. | |
| 2002/0090914 A1 | 7/2002 | Kang et al. | |
| 2002/0093478 A1 | 7/2002 | Yeh | |
| 2002/0112244 A1 | 8/2002 | Liou et al. | |
| 2002/0124097 A1 | 9/2002 | Isely et al. | |
| 2002/0129156 A1 | 9/2002 | Yoshikawa | |
| 2002/0143998 A1 | 10/2002 | Rajagopal et al. | |
| 2002/0163361 A1 | 11/2002 | Parkin | |
| 2002/0165921 A1 | 11/2002 | Sapieyevski | |
| 2003/0023741 A1 | 1/2003 | Tomassetti et al. | |
| 2003/0035444 A1 | 2/2003 | Zwack | |
| 2003/0041173 A1 | 2/2003 | Hoyle | |
| 2003/0041174 A1 | 2/2003 | Wen et al. | |
| 2003/0066094 A1 | 4/2003 | Van Der Schaar et al. | |
| 2003/0091322 A1 | 5/2003 | Van Der Schaar | |
| 2003/0099212 A1 | 5/2003 | Anjum et al. | |
| 2003/0099221 A1 | 5/2003 | Rhee | |
| 2003/0126211 A1 | 7/2003 | Anttila et al. | |
| 2003/0141849 A1* | 7/2003 | Kobayashi | H02J 7/0048 |
| | | | 320/136 |
| 2003/0157951 A1 | 8/2003 | Hasty, Jr. | |
| 2003/0195964 A1 | 10/2003 | Mane | |
| 2003/0198257 A1 | 10/2003 | Sullivan et al. | |
| 2003/0210796 A1 | 11/2003 | McCarty et al. | |
| 2003/0231871 A1 | 12/2003 | Ushimaru | |
| 2004/0001484 A1 | 1/2004 | Ozguner | |
| 2004/0001591 A1 | 1/2004 | Mani et al. | |
| 2004/0024478 A1 | 2/2004 | Hans et al. | |
| 2004/0024925 A1 | 2/2004 | Cypher et al. | |
| 2004/0027166 A1 | 2/2004 | Mangum et al. | |
| 2004/0170383 A1 | 9/2004 | Mazur | |
| 2004/0198425 A1* | 10/2004 | Mellone | H04M 1/6066 |
| | | | 455/574 |
| 2004/0203378 A1 | 10/2004 | Powers | |
| 2004/0249965 A1 | 12/2004 | Huggins et al. | |
| 2004/0249982 A1 | 12/2004 | Arnold et al. | |
| 2004/0252400 A1 | 12/2004 | Blank et al. | |
| 2005/0010691 A1 | 1/2005 | Oyadomari et al. | |
| 2005/0013394 A1 | 1/2005 | Rausch et al. | |
| 2005/0058149 A1 | 3/2005 | Howe | |
| 2005/0081213 A1 | 4/2005 | Suzuoki et al. | |
| 2005/0114538 A1 | 5/2005 | Rose | |
| 2005/0177643 A1 | 8/2005 | Xu | |
| 2005/0267999 A1 | 12/2005 | Suematsu et al. | |
| 2005/0281255 A1 | 12/2005 | Davies et al. | |
| 2005/0283820 A1 | 12/2005 | Richards et al. | |
| 2005/0288805 A1 | 12/2005 | Moore et al. | |
| 2006/0063560 A1* | 3/2006 | Herle | H04W 36/32 |
| | | | 455/552.1 |
| 2006/0109229 A1 | 5/2006 | Iwabuchi | |
| 2006/0200576 A1* | 9/2006 | Pickens | H04N 21/6405 |
| | | | 709/231 |
| 2006/0258322 A1* | 11/2006 | Conner | H04W 52/0296 |
| | | | 455/343.1 |
| 2007/0004436 A1* | 1/2007 | Stirbu | H04L 63/0272 |
| | | | 455/503 |
| 2007/0038999 A1 | 2/2007 | Millington | |
| 2007/0054680 A1 | 3/2007 | Mo et al. | |
| 2007/0055743 A1 | 3/2007 | Pirtle et al. | |
| 2007/0091834 A1* | 4/2007 | Lee | H04B 7/15521 |
| | | | 370/310 |
| 2007/0094691 A1* | 4/2007 | Gazdzinski | H04N 21/2387 |
| | | | 348/E7.071 |
| 2007/0107026 A1* | 5/2007 | Sherer | H04N 21/23406 |
| | | | 348/E5.003 |
| 2007/0142944 A1 | 6/2007 | Goldberg et al. | |
| 2007/0169115 A1* | 7/2007 | Ko | H04L 12/2838 |
| | | | 717/174 |
| 2007/0171059 A1* | 7/2007 | Pistilli | G08B 13/1436 |
| | | | 340/568.1 |
| 2007/0195294 A1* | 8/2007 | Willey | G03B 21/26 |
| | | | 353/34 |
| 2007/0197262 A1* | 8/2007 | Smith | H04L 12/2803 |
| | | | 455/562.1 |
| 2007/0254727 A1* | 11/2007 | Sewall | H04W 12/08 |
| | | | 455/574 |
| 2007/0271388 A1 | 11/2007 | Bowra et al. | |
| 2008/0075034 A1* | 3/2008 | Hsieh | H04W 48/16 |
| | | | 370/328 |
| 2008/0089658 A1 | 4/2008 | Grady et al. | |
| 2008/0116854 A1* | 5/2008 | Park | H02J 7/0068 |
| | | | 320/160 |
| 2008/0120429 A1 | 5/2008 | Millington et al. | |
| 2008/0146292 A1* | 6/2008 | Gilmore | H04M 1/6075 |
| | | | 455/572 |
| 2008/0274773 A1* | 11/2008 | Hsu | H04W 24/00 |
| | | | 455/574 |
| 2009/0082888 A1* | 3/2009 | Johansen | H04L 65/1101 |
| | | | 700/94 |
| 2009/0157905 A1 | 6/2009 | Davis | |
| 2009/0158360 A1* | 6/2009 | Diab | H04L 47/821 |
| | | | 725/75 |
| 2009/0169024 A1* | 7/2009 | Krug | H04L 65/403 |
| | | | 381/58 |
| 2009/0179496 A1* | 7/2009 | Ho | H02J 9/062 |
| | | | 307/66 |
| 2009/0193472 A1* | 7/2009 | Braithwaite | H04N 21/234 |
| | | | 725/74 |
| 2009/0196207 A1 | 8/2009 | Watanabe | |
| 2009/0228919 A1 | 9/2009 | Zott et al. | |
| 2009/0265416 A1* | 10/2009 | Svendsen | G06F 16/24556 |
| | | | 709/203 |
| 2010/0022237 A1* | 1/2010 | Wallis | H04M 1/72502 |
| | | | 455/426.1 |
| 2010/0049825 A1 | 2/2010 | Todoroki | |
| 2010/0210289 A1* | 8/2010 | Rooks | H04M 1/72502 |
| | | | 455/11.1 |
| 2010/0254361 A1* | 10/2010 | Naito | H04W 40/244 |
| | | | 370/338 |
| 2010/0306561 A1* | 12/2010 | Sathath | G06F 1/266 |
| | | | 713/320 |
| 2011/0044469 A1 | 2/2011 | Braithwaite et al. | |
| 2011/0072078 A1* | 3/2011 | Chai | H04L 65/1063 |
| | | | 709/206 |
| 2011/0084689 A1 | 4/2011 | Groth et al. | |
| 2011/0093605 A1* | 4/2011 | Choudhury | H04L 65/613 |
| | | | 709/231 |
| 2011/0116413 A1 | 5/2011 | Arai | |
| 2011/0158441 A1* | 6/2011 | Batra | H04R 1/1091 |
| | | | 455/67.11 |
| 2011/0216681 A1* | 9/2011 | Tao | H04W 52/02 |
| | | | 370/311 |
| 2012/0026992 A1* | 2/2012 | Navda | H04W 4/60 |
| | | | 370/338 |
| 2012/0029671 A1 | 2/2012 | Millington et al. | |
| 2012/0058727 A1* | 3/2012 | Cook | H04L 1/16 |
| | | | 455/41.3 |
| 2012/0091812 A1* | 4/2012 | Lin | H02J 7/0068 |
| | | | 307/66 |
| 2012/0210289 A1 | 8/2012 | Hench et al. | |
| 2013/0043730 A1* | 2/2013 | Claise | H02J 7/34 |
| | | | 307/66 |
| 2013/0051227 A1* | 2/2013 | Aoyagi | H04W 52/0248 |
| | | | 370/230 |

(56) References Cited

U.S. PATENT DOCUMENTS

| | | | | |
|---|---|---|---|---|
| 2013/0054863 | A1* | 2/2013 | Imes | H04L 47/70 709/223 |
| 2013/0080516 | A1 | 3/2013 | Bologh | |
| 2013/0094485 | A1* | 4/2013 | Jiang | H04W 52/0206 370/338 |
| 2013/0109339 | A1* | 5/2013 | Lindahl | G06F 1/3203 455/343.1 |
| 2013/0165179 | A1* | 6/2013 | Kawakita | H04W 52/0251 455/552.1 |
| 2013/0166925 | A1 | 6/2013 | Sip | |
| 2013/0229964 | A1* | 9/2013 | Chakravarthy | H04W 52/0212 370/311 |
| 2013/0294331 | A1* | 11/2013 | Wang | H04B 7/2606 370/315 |
| 2013/0331970 | A1* | 12/2013 | Beckhardt | H04N 21/8113 700/94 |
| 2013/0336499 | A1* | 12/2013 | Beckhardt | H04R 29/007 381/81 |
| 2014/0093085 | A1* | 4/2014 | Jarvis | H04R 27/00 381/17 |
| 2014/0153898 | A1* | 6/2014 | Ruster | G06F 3/0634 386/231 |
| 2014/0157024 | A1* | 6/2014 | Huang | G06F 1/3234 713/323 |
| 2014/0213227 | A1* | 7/2014 | Rao | H04W 4/21 455/414.3 |
| 2014/0221050 | A1* | 8/2014 | Kato | G06F 1/1692 455/566 |
| 2014/0270235 | A1* | 9/2014 | Shin | H04R 27/00 381/77 |
| 2014/0376737 | A1* | 12/2014 | Goldman | H04M 1/72412 381/80 |
| 2015/0294639 | A1* | 10/2015 | McCoy | G06F 3/14 345/173 |

FOREIGN PATENT DOCUMENTS

| | | |
|---|---|---|
| EP | 0672985 A1 | 9/1995 |
| EP | 1111527 A2 | 6/2001 |
| EP | 1389853 A1 | 2/2004 |
| EP | 1638360 A1 | 3/2006 |
| EP | 2567554 A1 | 3/2013 |
| EP | 2582037 | 4/2013 |
| EP | 2584863 A1 | 4/2013 |
| EP | 2739013 A1 | 6/2014 |
| JP | 2007095032 A | 4/2007 |
| JP | 2009188645 A | 8/2009 |
| JP | 2010287951 A | 12/2010 |
| JP | 2012129780 A | 7/2012 |
| WO | 199525313 | 9/1995 |
| WO | 9963698 A2 | 12/1999 |
| WO | 199961985 | 12/1999 |
| WO | 200153994 | 7/2001 |
| WO | 03096741 A2 | 11/2003 |
| WO | 2003093950 A2 | 11/2003 |
| WO | 2005057834 A2 | 6/2005 |
| WO | 2006091736 A2 | 8/2006 |
| WO | 2007000658 A2 | 1/2007 |
| WO | 2007075376 A1 | 7/2007 |
| WO | 2007095544 A2 | 8/2007 |
| WO | 2007120518 A2 | 10/2007 |
| WO | 2011031994 A1 | 3/2011 |
| WO | 2011129343 A1 | 10/2011 |
| WO | 2012137190 A1 | 10/2012 |
| WO | 2013098262 A1 | 7/2013 |
| WO | 2013101729 A1 | 7/2013 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:( http://www.bretl.com/mpeghtml/MPEGindex.htm), pp. 1-23.
Chinese Patent Office, First Office Action and Translation mailed on Nov. 19, 2019, issued in connection with Chinese Application No. 201480053810.1, 12 pages.
Chinese Patent Office, Office Action mailed on Apr. 19, 2019, issued in connection with Chinese Application No. 201480053810.1, 4 pages.
Chinese Patent Office, Office Action mailed on Aug. 27, 2018, issued in connection with Chinese Application No. 201480053810.1, 14 pages.
Chinese Patent Office, Office Action mailed on Oct. 9, 2019, issued in connection with Chinese Application No. 201480053810.1, 6 pages.
Decker et al., "RFC 1493, Definitions of Managed Objects for Bridges," Network Working Group, Jul. 1993, 35 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Jan. 26, 2022, issued in connection with European Application No. 18190934.2, 4 pages.
European Patent Office, European Extended Search Report mailed on Nov. 8, 2018, issued in connection with European Application No. 18190934.2, 9 pages.
European Patent Office, European Office Action mailed on Jan. 14, 2021, issued in connection with European Application No. 18190934.2, 4 pages.
European Patent Office, European Office Action mailed on Nov. 14, 2019, issued in connection with European Application No. 18190934.2, 4 pages.
European Patent Office, European Office Action mailed on Jul. 24, 2017, issued in connection with EP Application No. 14847600.5, 4 pages.
European Patent Office, Extended European Search Report mailed on Oct. 7, 2016, issued in connection with European Application No. 14847600.5, 10 pages.
Final Office Action mailed on Jul. 11, 2017, issued in connection with U.S. Appl. No. 14/042,072, filed Sep. 30, 2013, 13 pages.
Final Office Action mailed on Sep. 12, 2017, issued in connection with U.S. Appl. No. 15/219,256, filed Jul. 25, 2016, 14 pages.
Final Office Action mailed on Sep. 6, 2017, issued in connection with U.S. Appl. No. 14/940,490, filed Nov. 12, 2015, 12 pages.
Final Office Action mailed on Sep. 8, 2017, issued in connection with U.S. Appl. No. 15/219,258, filed Jul. 25, 2016, 13 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability mailed on Apr. 14, 2016, issued in connection with International Patent Application No. PCT/US2014/053835, filed on Sep. 3, 2014, 6 pages.
International Searching Authority, International Search Report mailed on Dec. 5, 2014, issued in connection with International Application No. PCT/US2014/053835, 3 pages.
International Searching Authority, Written Opinion mailed on Dec. 5, 2014, issued in connection with International Application No. PCT/US2014/053835, filed on Sep. 3, 2014, 4 pages.

(56) References Cited

OTHER PUBLICATIONS

Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, English Translation of Office Action mailed on May 30, 2017, issued in connection with Japanese Patent Application No. 2016-518760, 3 pages.
Japanese Patent Office, Office Action mailed on May 30, 2017, issued in connection with Japanese Application No. 2016-518760, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Levi et al., Request for Comments 4318, Definitions of Managed Objects for Bridges with Rapid Spanning Tree Protocol, Dec. 2005, 14 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Non-Final Office Action mailed on Sep. 15, 2022, issued in connection with U.S. Appl. No. 17/129,435, filed Dec. 21, 2020, 15 pages.
Non-Final Office Action mailed on Feb. 23, 2017, issued in connection with U.S. Appl. No. 14/940,490, filed Nov. 13, 2015, 10 pages.
Non-Final Office Action mailed on Feb. 23, 2017, issued in connection with U.S. Appl. No. 15/219,258, filed Jul. 25, 2016, 20 pages.
Non-Final Office Action mailed on Aug. 24, 2015, issued in connection with U.S. Appl. No. 14/042,072, filed Sep. 30, 30, 2013, 9 pages.
Non-Final Office Action mailed on Sep. 29, 2016, issued in connection with U.S. Appl. No. 14/042,072, filed Sep. 30, 2013, 8 pages.
Non-Final Office Action mailed on Feb. 4, 2020, issued in connection with U.S. Appl. No. 15/999,382, filed Aug. 20, 2018, 12 pages.
Non-Final Office Action mailed on Apr. 5, 2017, issued in connection with U.S. Appl. No. 15/219,256, filed Jul. 25, 2016, 19 pages.
North American MPEG-2 Information, "The MPEG-2 Transport Stream," Retrieved from the Internet: URL: http://www.coolstf.com/mpeg/#ts, 2006, pp. 1-5.
Notice of Allowance mailed on Nov. 17, 2022, issued in connection with U.S. Appl. No. 17/129,435, filed Dec. 21, 2020, 6 pages.
Notice of Allowance mailed on Sep. 2, 2020, issued in connection with U.S. Appl. No. 15/999,382, filed Aug. 20, 2018, 5 pages.
Notice of Allowance mailed on Apr. 25, 2018, issued in connection with U.S. Appl. No. 14/940,490, filed Nov. 13, 2015, 6 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Presentations at WinHEC 2000, May 2000, 138 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

SYNCHRONOUS PLAYBACK WITH BATTERY-POWERED PLAYBACK DEVICE

CROSS REFERENCE TO RELATED APPLICATIONS

This application claims priority under 35 U.S.C. § 120 to, and is a continuation of, U.S. Non-Provisional patent application Ser. No. 17/129,435, filed on Dec. 21, 2020, and entitled "Synchronous Playback With Battery-Powered Playback Device," which is a continuation of U.S. Non-Provisional patent application Ser. No. 15/999,382, filed on Aug. 20, 2018, issued as U.S. Pat. No. 10,871,817, and entitled "Synchronous Playback With Battery-Powered Playback Device," which is a continuation of U.S. Non-Provisional patent application Ser. No. 14/940,490, filed on Nov. 13, 2015, issued as U.S. Pat. No. 10,055,003, and entitled "Playback Device Operations Based On Battery Level," which is a continuation of U.S. Non-Provisional patent application Ser. No. 14/042,072, filed on Sep. 30, 2013, entitled "Transitioning A Networked Playback Device Between Operating Modes," the contents of each of which are incorporated herein by reference in their entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Along with consumers' increased preference for digital audio, many consumers have an increased preference for "going green." One common step taken by people attempting to "go green" is to reduce the amount of energy they consume. For example, consumers who are going green may make a conscious effort to turn off a light whenever they leave a room. Additionally, people may only purchase electronics that are rated to be "energy efficient." Other such examples of "going green" exist as well.

In view of this growing trending preference, some electronics developers are making efforts to "go green" as well. In the context of electronic devices within a network (e.g., a networked audio system), going green may have many challenges. For instance, certain devices may perform tasks that generally require the consumption of a relatively high amount of energy. Thus, if using conventional approaches, "going green" may be undesirable and possibly even impractical in certain networks and/or certain environments.

BRIEF DESCRIPTION OF THE DRAWINGS

Features, aspects, and advantages of the presently disclosed technology may be better understood with regard to the following description, appended claims, and accompanying drawings where:

Figure 1:
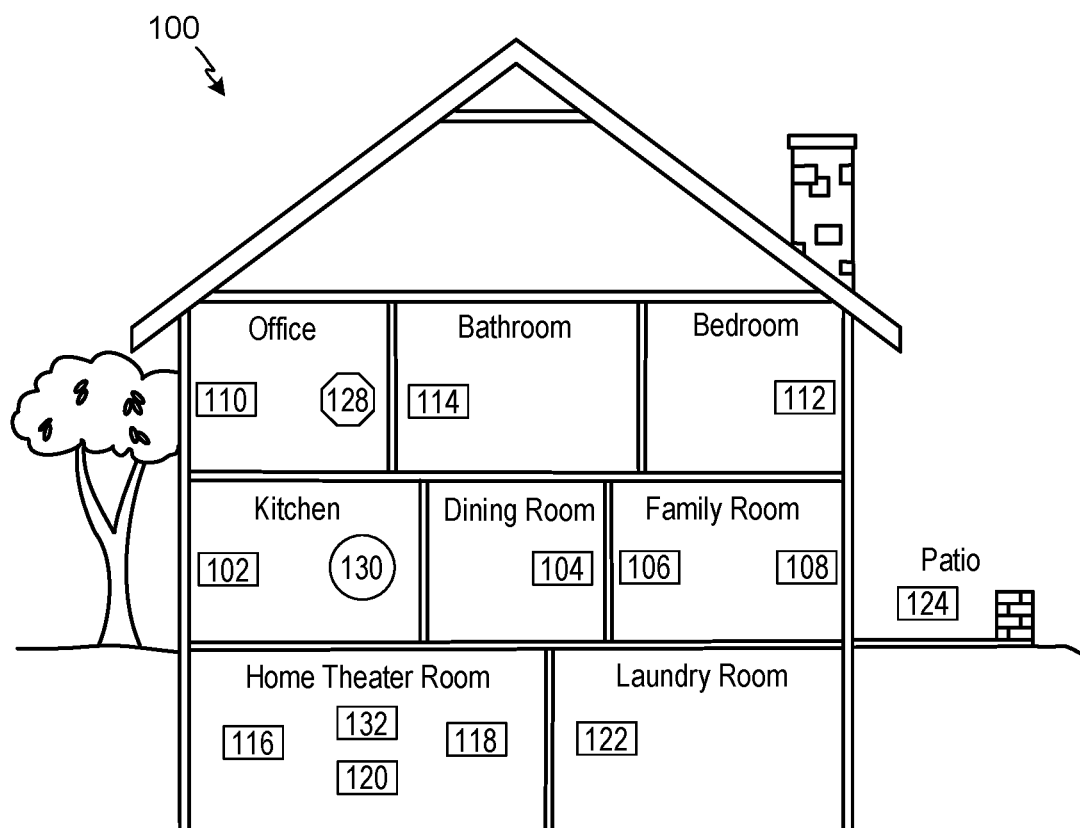
FIG. 1 shows an example media system configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that may allow a playback device to transition between operating modes to conserve power, among other benefits. In certain embodiments the playback device may be part of a networked media playback system that includes one or more other playback devices and at least one controller.

In one embodiment, the playback device may obtain power from an internal battery or an external power source, and based on the source of power, the playback device may operate in different modes. For example, when the playback device is receiving power from the internal battery, the playback device may operate in a "battery mode." When the playback device is receiving power from the external power source, the playback device may operate in a "powered mode."

The operating mode may determine what functions the playback device may perform. In one embodiment, when in either a battery mode or a powered mode, the playback device may receive commands to play audio content, and in turn the playback device may output the audio. In addition to audio playback, in some embodiments, the operating mode may determine the networking function that is supported by the playback device. In some embodiments, the powered mode may cause the playback device to serve as a network bridge and/or an access point for other network devices (including, but not limited to other devices in the networked media playback system). In some embodiments, the battery mode may cause the playback device to serve as a client device, where when serving as a client device the playback device does not serve as a network bridge.

In certain embodiments, the playback device may remain in its current operating mode until the playback device receives a command to transition to a different operating mode. In some instances, the playback device may receive the command from a second playback device. In other instances, the playback device may receive the command from a controller device.

As indicated above, the present application involves transitioning a playback device between operating modes, while the playback device is a member of a networked media playback system. In one aspect, a method is provided. The method involves determining, by a playback device, that the playback device is operating in one of a powered mode and a battery mode. The powered mode comprises the playback device receiving power from an external source. The battery mode comprises the playback device receiving power from at least one battery. The method further involves causing the playback device to serve as a network bridge when the playback device is in the powered mode. The method further involves causing the playback device to (a) serve as a client device and (b) not serve as a network bridge when the playback device is in the battery mode.

In another aspect, a playback device is provided. The playback device includes at least one battery, a network interface, a non-transitory computer readable medium, and program instructions stored on the non-transitory computer readable medium. The program instructions are executable by at least one processor to cause the playback device to determine that the playback device is operating in one of a powered mode and a battery mode. The powered mode comprises the playback device receiving power from an external source. The battery mode comprises the playback device receiving power from the at least one battery. The program instructions are executable by the at least one processor to further cause the playback device to serve as a network bridge when operating in the powered mode. The program instructions are executable by the at least one processor to further cause the playback device to (a) serve as a client device and (b) not serve as a network bridge when operating in the battery mode.

In yet another aspect, a non-transitory computer readable medium is provided. The non-transitory computer readable medium having instructions stored thereon that are executable by at least one processor. The instructions include instructions for determining that a playback device is operating in one of a powered mode and a battery mode. The powered mode comprises the playback device receiving power from an external source. The battery mode comprises the playback device receiving power from at least one battery. The instructions further include instructions for causing the playback device to serve as a network bridge when the playback device is operating in the powered mode. The instructions further include instructions for causing the playback device to (a) serve as a client device and (b) not serve as a network bridge when the playback device is operating in the battery mode. Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. The zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. The controller 130 may be fixed to a zone, or alternatively, it may be mobile such that it can be moved about the zones. The media system configuration 100 may also include more than the one controller 130, and additional controllers may be added to the system over time.

The media system configuration 100 illustrates an example whole house media system, though it is understood that the technology described herein is not limited to, among other things, its particular place of application or to an expansive system like the whole house media system configuration 100 of FIG. 1.

a. Example Zone Players

Figure 2A:
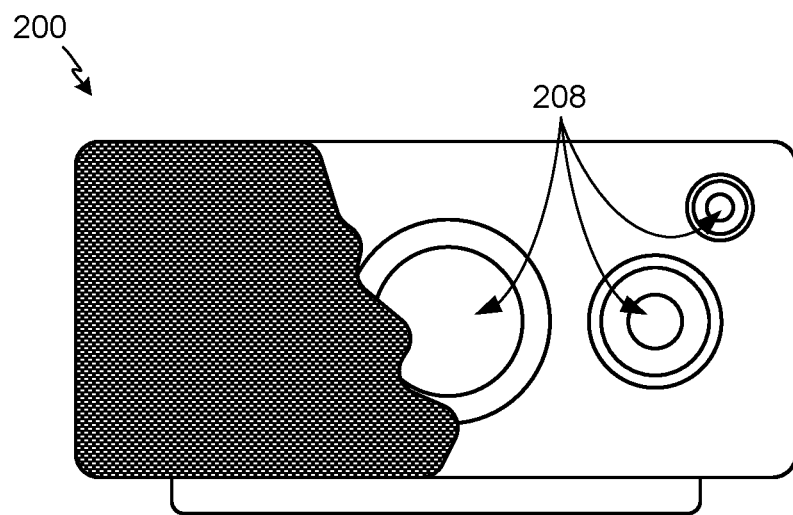
FIG. 2A shows an illustration of an example zone player having a built-in amplifier and transducers.
Figure 2B:
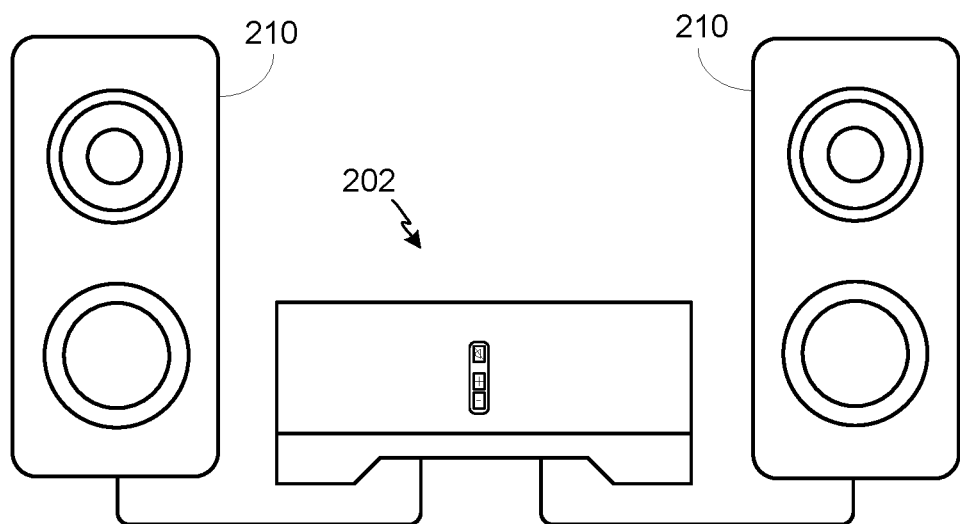
FIG. 2B shows an illustration of an example zone player having a built-in amplifier and connected to external speakers.
Figure 2C:
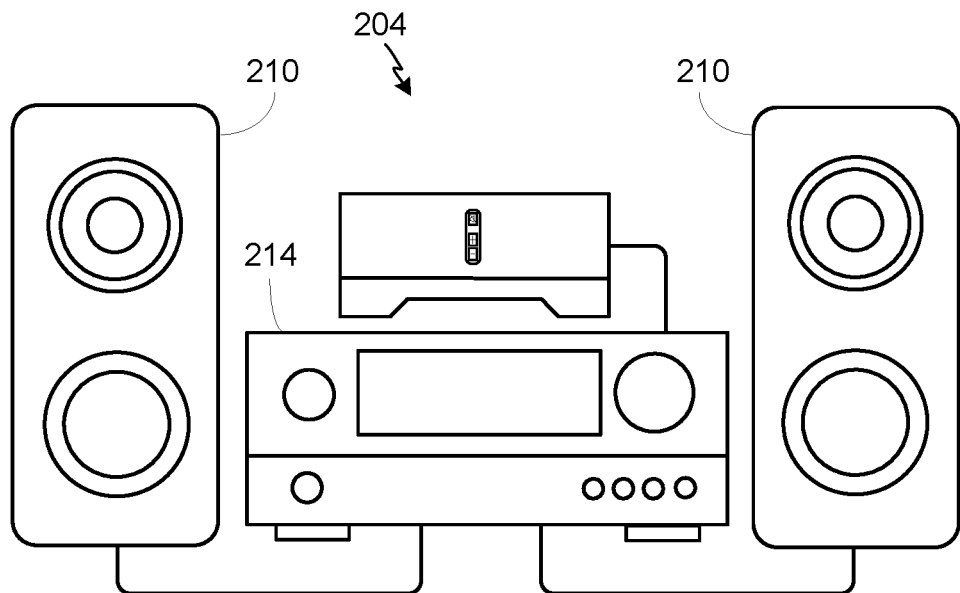
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, each zone player 200-204 may also be referred to as a "smart speaker," because they may contain processing capabilities beyond the reproduction of audio, more of which is described below.

FIG. 2A illustrates the zone player 200 that includes sound producing equipment 208 capable of reproducing full-range sound. The sound may come from an audio signal that is received and processed by the zone player 200 over a wired or wireless data network. The sound producing equipment 208 may include one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, the zone player 200 can be statically or dynamically configured to play stereophonic audio, monaural audio, or both. In some embodiments, the zone player 200 may be dynamically configured to reproduce a subset of full-range sound, such as when the zone player 200 is grouped with other zone players to play stereophonic audio, monaural audio, and/or surround audio or when the media content received by the zone player 200 is less than full-range.

FIG. 2B illustrates the zone player 202 that includes a built-in amplifier to power a set of detached speakers 210. A detached speaker can include, for example, any type of loudspeaker. The zone player 202 may be configured to power one, two, or more separate loudspeakers. The zone player 202 may be configured to communicate an audio signal (e.g., right and left channel audio or more channels depending on its configuration) to the set of detached speakers 210 via a wired path.

FIG. 2C illustrates the zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102-124 can retrieve audio directly from a source. For example, a particular zone player in a zone or zone group may be assigned to a playback queue (or "queue"). The playback queue may contain information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

As described, a zone player (e.g., any of the zone players 102-124) may perform various networking functions. For instance, a zone player may serve as a "bridge" for other zone players and/or serve as an "access point" for one or more controllers. At the same time, the zone player may additionally perform audio reproduction functions.

As discussed further below, in one arrangement, a first zone player may be one of several other zone players that together form a network (e.g., an ad-hoc or "mesh" network). When the first zone player serves as a bridge for a second zone player, the first zone player may receive data (e.g., audio data) from a network device (e.g., a third zone player, a controller, a router, etc.) and the first zone player may then transmit the received data to the second zone player. When the first zone player serves as an access point for a controller, the first zone player may connect the controller to other devices in the network (e.g., other zone players). In general, each zone player in the network may, at some time, serve as a bridge for another zone player in the network, and each zone player may, at some time, also serve as an access point for one or more controllers. In certain embodiments, it may be preferable for only certain zone players within a network to serve as a bridge and/or an access point, while other zone players serve as client devices. A client device is a network device that can be a source or a destination for networking data, but does not forward data to other network devices. For example, a client device may transmit and receive data to a device acting as, for example, an access point or bridge, output audio (for example, through internal speakers, or through an audio interface to external speakers such as described in FIG. 2), and source audio (for example, through an audio line-in or another input interface). Put simply, a zone player serving as a client device may source or play audio, while a zone player serving as a network bridge or access point may forward data to other network devices as well as source and play audio.

By way of illustration, SONOS, Inc. of Santa Barbara, California presently offers for sale zone players referred to as a "PLAY:5," "PLAY:3," "PLAYBAR," "CONNECT: AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
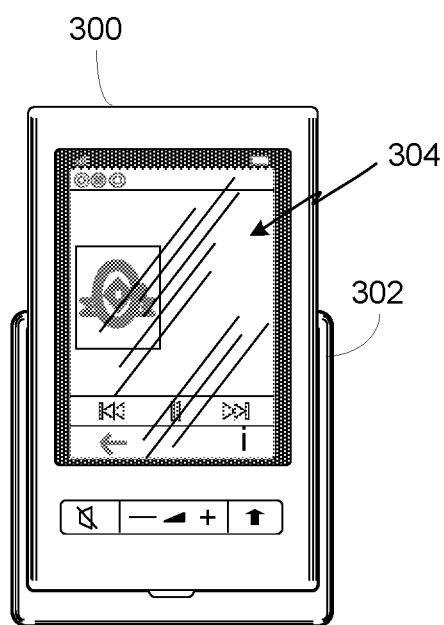
FIG. 3 shows an illustration of an example controller.

FIG. 3 illustrates an example wireless controller 300 in a docking station 302. By way of illustration, the controller 300 may correspond to the controller 130 of FIG. 1. The docking station 302, if provided or used, may provide power to the controller 300 and additionally may charge a battery of the controller 300. In some embodiments, the controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the media system configuration 100. In other embodiments, other input mechanisms such as voice control may be used to interact with the controller 300. In certain embodiments, any number of controllers can be used to control the media system configuration 100. In some embodiments, there may be a limit set on the number of controllers that can control the media system configuration 100. The controllers might be wireless like the wireless controller 300 or wired to the data network 128.

In some embodiments, if more than one controller is used in the media system configuration 100 of FIG. 1, each controller may be coordinated to display common content, and may all be dynamically updated to indicate changes made to the media system configuration 100 from a single controller. Coordination can occur, for instance, by a controller periodically requesting a state variable directly or indirectly from one or more of the zone players; the state variable may provide information about the media system configuration 100, such as current zone group configuration, what is playing in one or more zones, volume levels, and other items of interest. The state variable may be passed around on the data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as the controller 130. An application running on a laptop or desktop personal computer (PC) or Mac™ can also be used as the controller 130. Such controllers may connect to the media system configuration 100 through an interface with the data network 128, a zone player, a wireless router, or using some other configured connection path. Example controllers offered by Sonos, Inc. of Santa Barbara, California include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

The zone players 102-124 of FIG. 1 may be coupled directly or indirectly to a data network, such as data network 128. The controller 130 may also be coupled directly or indirectly to the data network 128 or individual zone players. The data network 128 is represented by an octagon in the figure to stand out from other representative components. While the data network 128 is shown in a single location, it is understood that such a network is distributed in and around the media system configuration 100. Particularly, the data network 128 can be a wired network, a wireless network, or a combination of both wired and wireless networks. In some embodiments, one or more of the zone players 102-124 may be wirelessly coupled to the data network 128 based on a proprietary mesh network. In some embodiments, one or more of the zone players may be coupled to the data network 128 using a centralized access point such as a wired or wireless router. In some embodiments, one or more of the zone players 102-124 may be coupled via a wire to the data network 128 using Ethernet or similar technology. In addition to the one or more zone players 102-124 connecting to the data network 128, the data network 128 can further allow access to a wide area network, such as the Internet.

In some embodiments, connecting any of the zone players 102-124, or some other connecting device, to a broadband router, may create the data network 128. Other of the zone players 102-124 may then be added wired or wirelessly to the data network 128. For example, a zone player (e.g., any of the zone players 102-124) can be added to the media system configuration 100 by simply pressing a button on the zone player itself (or perform some other action), which enables a connection to be made to the data network 128. The broadband router can be connected to an Internet Service Provider (ISP), for example. The broadband router can be used to form another data network within the media system configuration 100, which can be used in other applications (e.g., web surfing). The data network 128 can also be used in other applications, if so programmed. An example second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains the two zone players 106 and 108, while the kitchen is shown with the one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via the controller 130. As such, zones may be created, combined with another zone, removed, and given a specific name (e.g., "Kitchen"), if so desired and programmed to do so with the controller 130. Moreover, in some embodiments, zone configurations may be dynamically changed even after being configured using the controller 130 or some other mechanism.

In some embodiments, a "bonded zone" contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using the controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via the zone player 124, while someone is preparing food in the kitchen and listening to classical music via the zone player 102. Further, someone can be in the office listening to the same jazz music via the zone player 110 that is playing on the patio via the zone player 124. In some embodiments, the jazz music played via the zone players 110 and 124 may be played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content that may be played by the zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 may be used as a source of audio for the home theater zone players 116, 118, 120, while in other examples audio information from the television 132 may be shared with any of the zone players 102-124 in the media system configuration 100.

III. Example Zone Players

Figure 4:
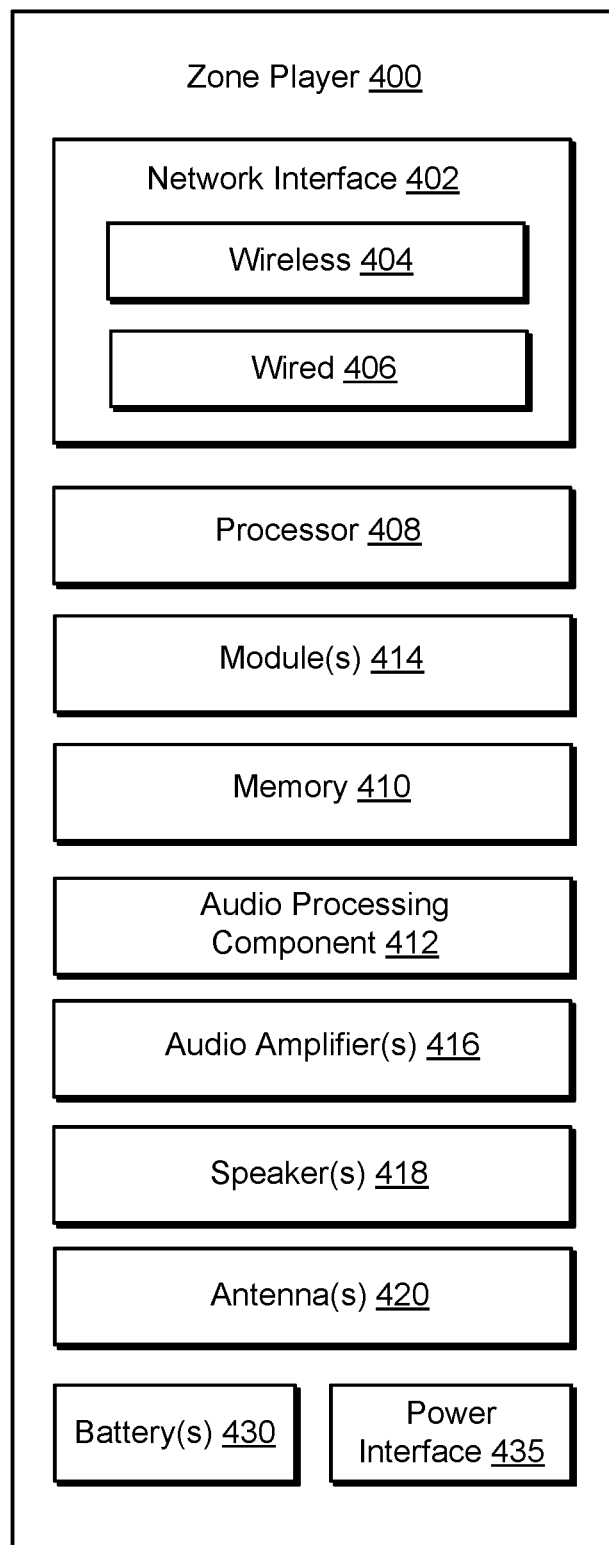
FIG. 4 shows an internal functional block diagram of an example zone player.

Referring now to FIG. 4, there is shown an example block diagram of a zone player 400 in accordance with an embodiment. The zone player 400 may include a network interface 402, at least one processor 408, a memory 410, an audio processing component 412, one or more software modules 414, an audio amplifier 416, a speaker unit 418 coupled to the audio amplifier 416, at least one battery 430, and a power interface 435. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, the network interface 402 facilitates a data flow between the zone player 400 and other devices on the data network 128. In some embodiments, in addition to getting audio from another zone player or device on the data network 128, the zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). The wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player may include multiple wireless 404 interfaces. In some embodiments, a zone player may include multiple wired 406 interfaces. In some embodiments, a zone player may include both of the interfaces 404 and 406. In some embodiments, a zone player may include only the wireless interface 404 or the wired interface 406.

In some embodiments, the at least one processor 408 is a clock-driven electronic device that is configured to process input data according to instructions stored in the memory 410. The memory 410 is data storage that can be loaded with the one or more software modules 414, which can be executed by the at least one processor 408 to achieve certain tasks. In the illustrated embodiment, the memory 410 is a tangible machine-readable medium storing instructions that can be executed by the at least one processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks (e.g., those discussed below) can be achieved via the one or more software modules 414 and the at least one processor 408.

The at least one battery 430 and/or the power interface 435 may provide power to the zone player 400. The at least one battery 430 may be a rechargeable battery (e.g., a lithium-ion battery, a lithium-ion polymer battery, a lead-acid battery, a nickel cadmium battery, or a nickel metal hydride battery, among other examples) or a disposable battery. The power interface 435 may include an adapter configured to obtain power from an electrical outlet, an external battery, or any other external power source. The power interface 435 may provide power to the zone player 400 and/or may charge the at least one battery 430 when the power interface 435 is receiving power from an external source.

In some embodiments, the at least one processor 408 may receive an indication that the power interface 435 is receiving power from an external power source, and the at least one processor 408 may then cause the zone player 400 to operate in a powered mode. While in the powered mode, the zone player 400 may serve as a "bridge" and/or "access point" for other networked devices (e.g., as discussed above with respect to the various networking functions of a zone player). As a bridge, the zone player 400 may receive data from one network device and transmit the received data to another network device, among other functions.

In other embodiments, the at least one processor 408 may receive an indication that the power interface 435 is not receiving power from an external power source (e.g., the at least one processor 408 may determine that the at least one battery 430 is the only source of power), and the at least one processor 408 may then cause the zone player 400 to operate in a battery mode. While in the battery mode, the zone player may serve as a client device, as opposed to serving as a "bridge" or as an "access point" for other devices (e.g., as discussed above with respect to the various networking functions of a zone player). In some embodiments, as a client device, the zone player 400 may transmit and receive data to and from, respectively, other network devices as well as source or output audio, but may not forward data to other network devices. For example, while serving as a client device, the zone player 400 may transmit a request to a streaming content provider for a data stream and then receive the stream from the content provider, but the zone player 400 may not transmit the received data stream to another zone player. In another example, while serving as a client device, the zone player 400 may act as an audio source and transmit audio data to a first network device. Other examples are also possible.

In some embodiments, the at least one processor 408 may determine a power level of the at least one battery 430. The at least one processor 408 may determine that the power level is below a predefined threshold and accordingly, generate and cause the zone player to transmit a power-level message, for example, to a networked device. The power-level message may indicate, for example, that the zone player has a low battery level, that (as a result) the zone player can no longer serve as an access point or a bridge, that the other networked device should find a new access point and/or bridge, etc. Other examples are certainly possible. In one embodiment, the zone player may act as a bridge or a client device based on the determined power level.

The audio processing component 412 can include one or more digital-to-analog converters (DAC), an audio preprocessing component, an audio enhancement component or a digital signal processor, and so on. In some embodiments, the audio processing component 412 may be part of the at least one processor 408. In some embodiments, the audio that is retrieved via the network interface 402 may be processed and/or intentionally altered by the audio processing component 412. Further, the audio processing component 412 can produce analog audio signals. The processed analog audio signals may then be provided to the audio amplifier 416 for playback through the speaker unit 418. In addition, the audio processing component 412 can include circuitry to process analog or digital signals as inputs to play from the zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers of the speaker unit 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
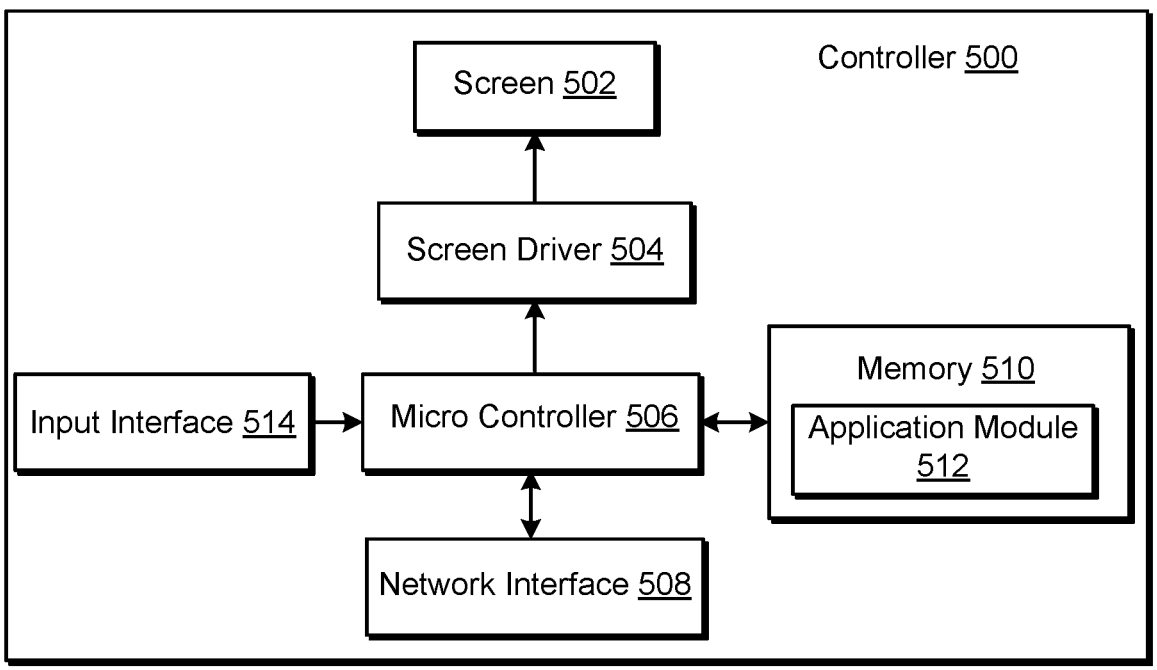
FIG. 5 shows an internal functional block diagram of an example controller.

Referring now to FIG. 5, there is shown an example block diagram for a controller 500, which can correspond to the controller 130 in FIG. 1. The controller 500 can be used to facilitate the control of multi-media applications, automation and others in a system. In particular, the controller 500 may be configured to facilitate a selection of a plurality of audio sources available on the data network 128 and enable control of one or more zone players (e.g., the zone players 102-124 in FIG. 1) through a wireless or wired network interface 508. According to one embodiment, the wireless communications may be based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to the controller 500 for display.

The controller 500 may be provided with a screen 502 and an input interface 514 that may allow a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The controller memory 510 can be loaded with one or more application modules 512 that can be executed by the microcontroller 506 with or without a user input via the user interface 514 to achieve certain tasks. In some embodiments, the application module 512 may be configured to facilitate grouping a number of selected zone players into a zone group to facilitate synchronized playback amongst the zone players in the zone group. In some embodiments, the application module 512 may be configured to control the audio sounds (e.g., volume) of the zone players in a zone group. In operation, when the microcontroller 506 executes one or more of the application modules 512, the screen driver 504 may generate control signals to drive the screen 502 to display an application specific user interface accordingly.

The controller 500 includes a network interface 508 that may facilitate wired or wireless communication with a zone player. In some embodiments, the commands such as volume control and audio playback synchronization may be sent via the network interface 508. In some embodiments, a saved zone group configuration may be transmitted between a zone player and a controller via the network interface 508.

The controller 500 can control one or more zone players, such as the zone players 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smartphone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
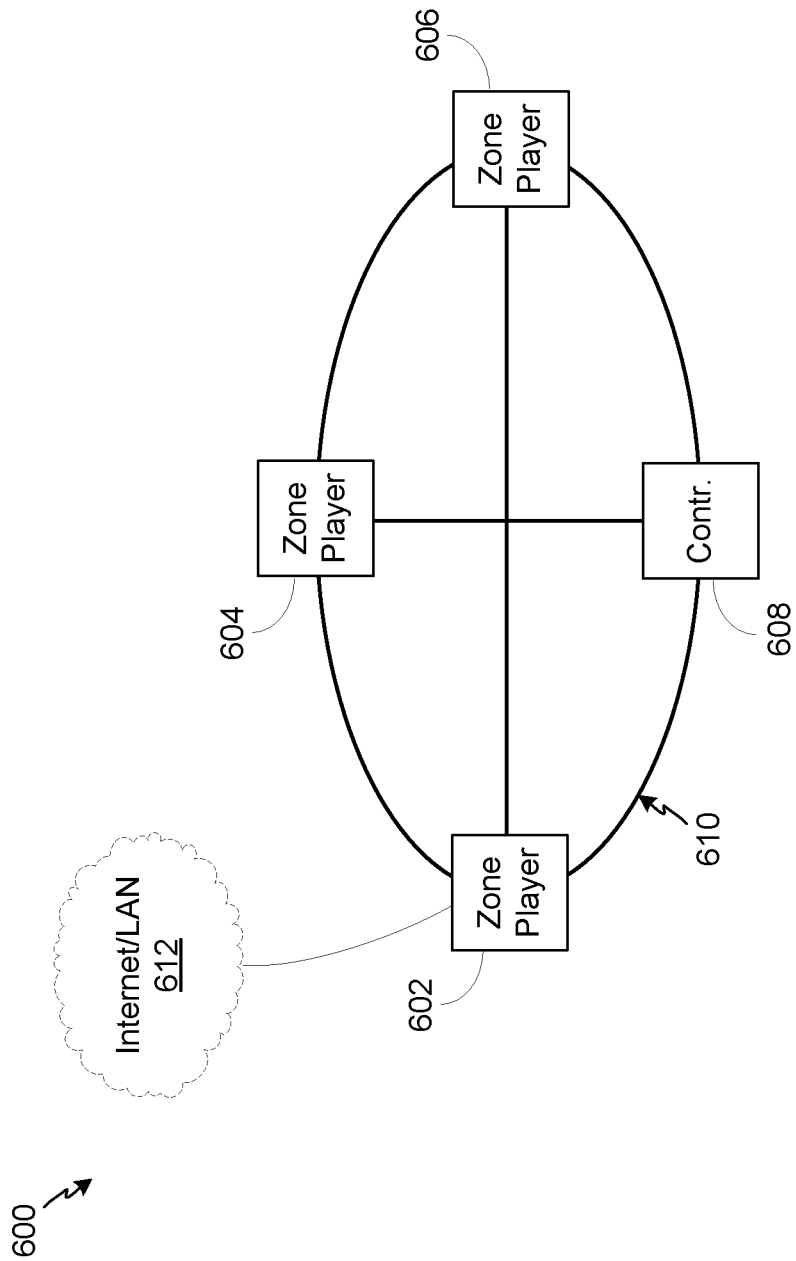
FIG. 6 shows an example ad-hoc playback network.

Particular examples are now provided in connection with FIG. 6 to describe, for purposes of illustration, certain embodiments to provide and facilitate connection to a playback network. FIG. 6 shows that there are three zone players 602, 604 and 606 and a controller 608 that form a network branch that is also referred to as an Ad-Hoc network 610. The Ad-Hoc network 610 may be wireless, wired, or a combination of wired and wireless technologies. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the Ad-Hoc network 610, and the Ad-Hoc network 610 will automatically reconfigure itself without needing the user to reconfigure the Ad-Hoc network 610. While an Ad-Hoc network is referenced in FIG. 6, it is understood that a playback network may be based on a type of network that is completely or partially different from an Ad-Hoc network (e.g., a mesh network).

Using the Ad-Hoc network 610, the devices 602, 604, 606, and 608 can share or exchange one or more audio sources and be dynamically grouped (or ungrouped) to play the same or different audio sources. For example, the zone players 602 and 604 may be grouped to playback one piece of music, and at the same time, the zone player 606 may playback another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service.

In certain embodiments, a household identifier (HHID) is a short string or an identifier that is computer-generated to help ensure that it is unique. Accordingly, the Ad-Hoc network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD may include two types of network nodes: a control point (CP) and a zone player (ZP). The CP controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The ZP is any other device on the network that is placed to participate in the automatic configuration process. In certain embodiments, the ZP, as a notation used herein, may include the controller 308 or a computing device, for example. In some embodiments, the functionality, or certain parts of the functionality, in both the CP and the ZP may be combined at a single node (e.g., a ZP contains a CP or vice-versa).

In certain embodiments, HOUSEHOLD configuration may involve multiple CPs and ZPs that rendezvous and establish a known configuration such that they can use a standard networking protocol (e.g., IP over Wired or Wireless Ethernet) for communication. In an embodiment, two types of networks/protocols may be employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 602 in FIG. 6 is shown to be connected to both networks, for example. The connectivity to the network 612 may be based on Ethernet and/or Wireless, while the connectivity to other devices 602, 604 and 608 may be based on Wireless and Ethernet if so desired.

It is understood, however, that in some embodiments each zone player 602-606 may access the Internet when retrieving media from the cloud (e.g., the Internet) via the bridging device. For example, the zone player 602 may contain a uniform resource locator (URL) that specifies an address to a particular audio track in the cloud. Using the URL, the zone player 602 may retrieve the audio track from the cloud, and ultimately play the audio out of one or more of the other zone players.

VI. Transitioning Operating Modes

As discussed above, a zone player may operate in various modes, and in certain embodiments, it may be advantageous to control the operating mode of a zone player (e.g., to conserve power). Consequently, in certain embodiments, a zone player's network transmissions may be limited based on the power source of the zone player and/or requests from other network devices.

Figure 7A:
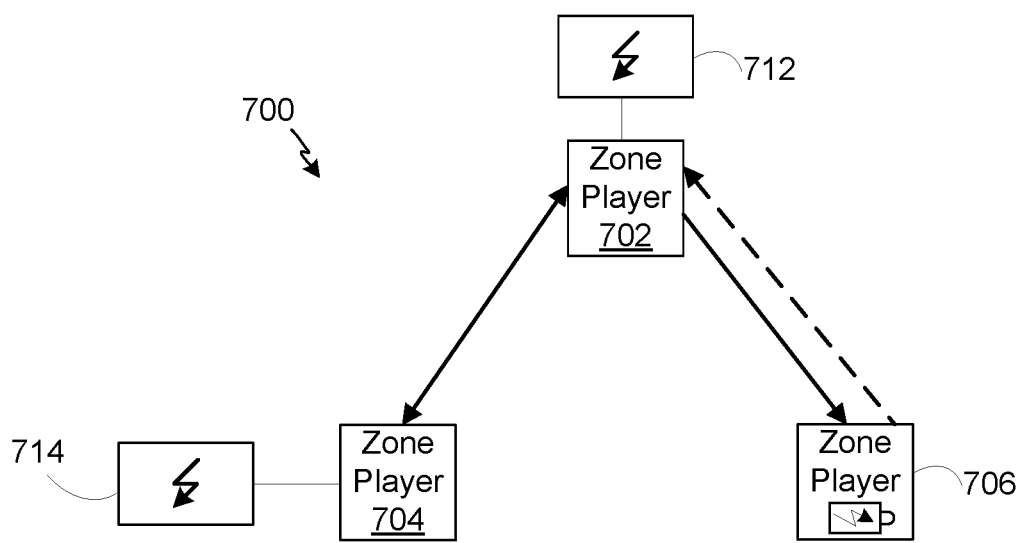
FIG. 7A shows an example system configuration at a first point in time.
Figure 7B:
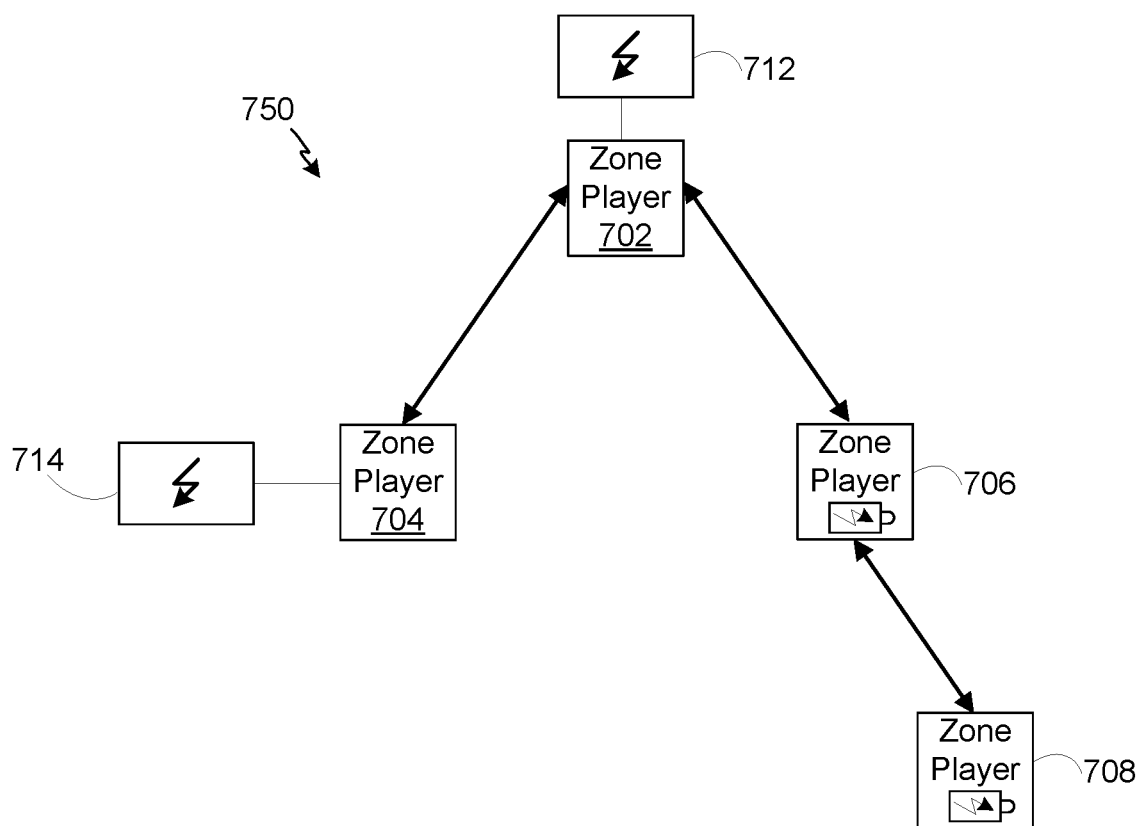
FIG. 7B shows an example system configuration at a second point in time.
Figure 8A:
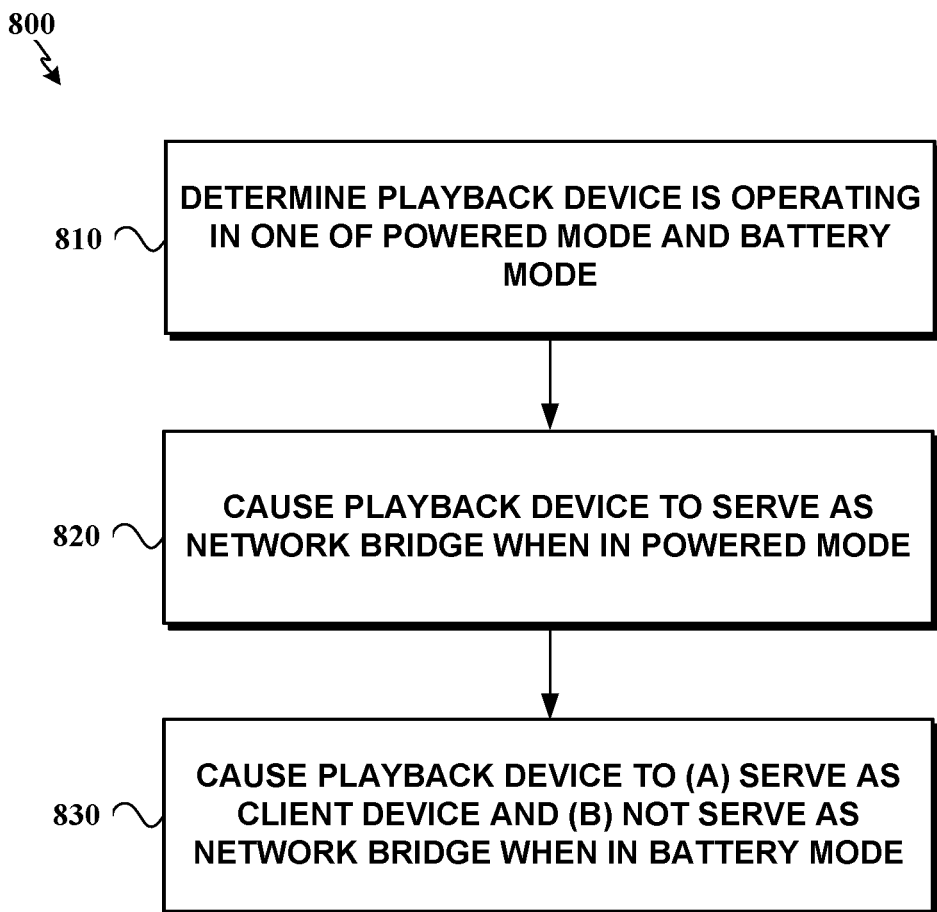
FIGS. 8A, 8B, and 8C show simplified flowcharts for transitioning a networked playback device between operating modes.
Figure 8B:
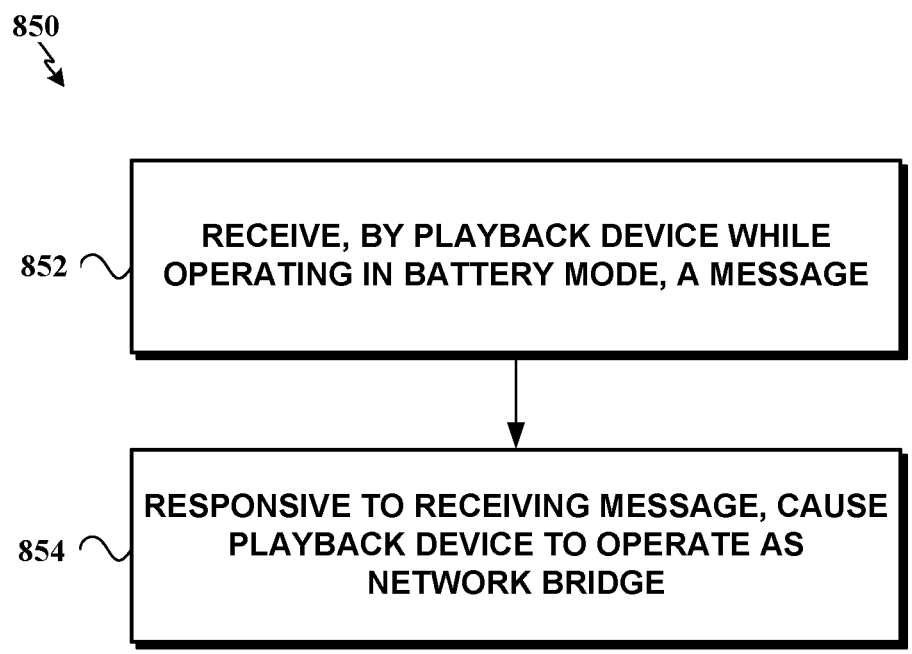
Figure 8C:
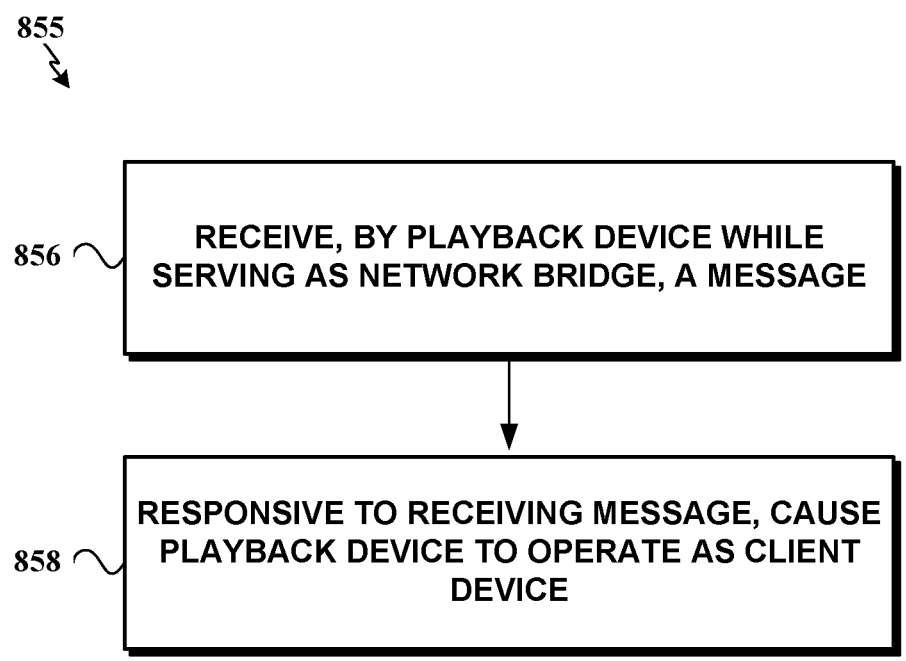

FIGS. 8A-8C are flowcharts that depict example methods for transitioning a networked playback device between operating modes. The example methods are described by way of example as being carried out by a playback device. For clarity, the methods are described herein with reference to FIGS. 7A and 7B, and are described as carried out by a zone player. It should be understood, however, that this is for purposes of example and explanation only and that the methods described herein may be carried out by various other playback devices.

In connection with the following descriptions of the example methods, FIGS. 7A and 7B depict an example system configuration at two different points in time. FIG. 7A depicts the system configuration at a first point in time 700. FIG. 7B depicts the system configuration at a second point in time 750. It should be understood that the second point in time 750 occurs sometime after the first point in time 700.

Furthermore, those skilled in the art will understand that the flowchart described herein depicts functionality and operation of certain implementations of example embodiments. In this regard, each block of the flowchart may represent a module, a segment, or a portion of program code, which includes one or more instructions executable by a processor for implementing specific logical functions or steps in the process. The program code may be stored on any type of computer readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

FIG. 8A is a flowchart depicting an example method 800 for transitioning a networked playback device between operating modes. As shown in block 810, the method 800 may involve the playback device (e.g., any zone player described herein) determining that the playback device is operating in one of a powered mode and a battery mode. A determination that the playback device is operating in the powered mode may include determining that the playback device is receiving power from an external source (e.g., the power interface 435 may be connected to an electrical outlet). A determination that the playback device is operating in the battery mode may include determining that the playback device is receiving power from at least one battery (e.g., the power interface 435 may not be connected to an external power source, and the zone player 400 is powered by the at least one battery 430).

The playback device may make a determination as to which operating mode to operate in via at least one processor (e.g., the at least one processor 408). The at least one processor 408 may receive a power signal that indicates that the zone player is receiving power from an external source. Further, the at least one processor 408 may receive a battery signal (or the absence of the power signal) that indicates that the zone player is not receiving power from an external source. The determination may be based on any such power signal or battery signal. In some embodiments, this determination may occur, for example, by periodically checking the power signal or battery signal, when an interrupt is received at the processor indicating a change from one mode (e.g. power mode) to another mode (e.g., battery mode).

For example, referring now to FIG. 7A, the system configuration at the first point in time 700 may include certain zone players operating in the powered mode, while other zone players are operating in the battery mode. As shown, the system configuration 700 includes the zone players 702-706 and external power sources 712-714. In some embodiments, the external power sources 712-714 may be docking stations connected to an electrical outlet. The external power sources 712-714 may connect with the zone players 702-704 (e.g., via the power interface 435) and may provide power to the zone players 702-704 and/or may charge internal batteries (e.g., the at least one battery 430) of the zone players 702-704. The zone players 702-706 may form a network (e.g., an ad-hoc or "mesh" network). In other embodiments, the zone players 702-706 may be part of a local area network (which may be an ad-hoc, a "mesh" network, a star network, or another type of network).

As depicted, the zone player 702 is connected to the external power source 712. At least one processor of the zone player 702 may determine that the zone player 702 is receiving power from an external source, and thus, the zone player 702 is in the powered mode. Likewise, the zone player 704 is connected to the external power source 714, and the zone player 704 may determine that the zone player 704 is operating in the powered mode. Further, as depicted, the zone player 706 is not connected to an external power source. At least one processor of the zone player 706 may determine that the zone player 706 is receiving power from an internal battery, and therefore, the zone player 706 is operating in the battery mode (as indicated by the battery symbol in FIG. 7A).

Referring back to FIG. 8A, at block 820, the method 800 may involve causing the playback device to serve as a network bridge when the playback device is in the powered mode. In some embodiments, at least one processor may cause the zone player to serve as a network bridge. For example, the at least one processor 408 may receive a power signal that indicates that the zone player is receiving power from an external source, and the at least one processor 408 may then cause the zone player to serve as a network bridge. While serving as a network bridge, the zone player may receive data from a first network device and transmit the received data to a second network device.

Referring back to FIG. 7A, while operating in the powered mode, the zone player 702 may be configured to serve as a network bridge if so required by other devices within the network. For example, the zone player 706 may be out of range of the zone player 704, but the zone player 706 may be within the range of the zone player 702. Consequently, when the zone player 706 requires data from a part of the network that the zone player 706 is outside the range of, the zone player 702 may be caused to serve as a network bridge for the zone player 706. The zone player 702 may then receive data from the zone player 704 and transmit the data to the zone player 706. Other examples are also possible.

In other embodiments, while operating in the powered mode, the playback device (e.g. the zone player 702) may be further caused to serve as an access point for at least one controller device (e.g., the controller 300). As the access point for the at least one controller device, the playback device may provide the at least one controller device a means for communicating with other playback devices that are networked with the playback device (e.g., any zone players that the zone player 702 is acting as a bridge for). For example, the zone player 702 may serve as an access point for a controller (not pictured), and consequently, the controller may communicate with the zone players 704 and 706.

In some embodiments, while serving as a network bridge and/or as an access point, the zone player may receive at least one command to output media and in response to receiving the at least one command, the playback device may output the media. For example, the zone player 702 may receive a command from another device (e.g., the zone player 704, the zone player 706, or a controller) to play a music stream. The zone player 702 may, in response to the command, locate the music stream and output the music stream at the zone player 702.

At block 830, the method 800 may involve causing the playback device to (a) serve as a client device and (b) not serve as a network bridge when the playback device is in the battery mode. In some embodiments, at least one processor may cause a zone player to serve as a client device and not allow the zone player to act as a network bridge. For example, the at least one processor 408 may receive a battery signal that indicates that the zone player 400 is receiving power from the at least one battery 435 and not an external power source, and the at least one processor 408 may then cause the zone player 400 to serve as a client device. In other embodiments, the at least one processor 408 may cause the zone player 400 to serve as a client device in response to not receiving a power signal.

While serving as a client device, a zone player (e.g., the zone player 706) may have limited transmission permissions relative to a zone player serving as a network bridge. For example, as a client device, the zone player 706 may receive data from other network devices (e.g., the zone player 702) but may not transmit the received data to another network device. A client device (e.g., the zone player 706) may receive commands to play audio and then output the desired audio. Additionally, the client device may act as a source for audio (e.g., line-in interface on the zone player 706, if applicable) to be played elsewhere in the networked media playback system.

Referring back to FIG. 7A, the zone player 706 is operating in the battery mode. At least one processor of the zone player 706 may cause the zone player 706 to serve as a client device. While serving as a client device, the zone player 706 may have limited transmission permissions (as depicted by the dashed arrow in FIG. 7A). For example, as a client device, the zone player 706 may not serve as a bridge or access point for another network device (e.g., another zone player or controller). The zone player 706 may receive data (e.g., an audio stream) from the zone player 702 but the zone player 706 may not forward data it receives from the zone player 702 to another device (e.g., another zone player or a controller). Other examples are certainly possible.

FIG. 8B is a flowchart depicting an example method 850 for transitioning a networked playback device between operating modes. In some embodiments, the method 850 may be carried out after or in combination with the method 800.

At block 852, the method 850 may involve, while the playback device is operating in the battery mode, the playback device receiving a message from at least one additional playback device. In one embodiment, the message may indicate a request to join a network that the playback device is part of. In other embodiments, the message may indicate a request that the playback device serve as a network bridge. Other example messages are also possible.

For example, referring now to FIG. 7B, the system configuration at the second point in time 750 may include the zone players 702-706 operating in the same modes as they were at the end of the first point in time (e.g., as depicted in FIG. 7A). For example, the zone players 702-704 may operate in the powered mode (e.g., serving as bridges), and the zone player 706 may operate in the battery mode (e.g., serving as a client device).

The zone player 706 may receive a message from a zone player 708. The message may be a probe message indicating an attempt by the zone player 708 to join (or possibly rejoin the network if the zone player 708 lost connectivity) the network formed by the zone players 702-706. (It is presumed that the zone player 708 previously obtained credentials to communicate with the zone players 702-706). The zone player 706 may receive the message from the zone player 708 because the zone player 708 is out of the coverage range of the other zone players 702-704 that are acting as network bridges (e.g., the zone player 708 is only within the range of the zone player 706).

In some embodiments, after the zone player 706 receives the message, the zone player 706 may send a return message indicating that the zone player 706 can provide connectivity (e.g., the zone player 706 may transmit an acceptance response to the zone player 708). In other embodiments, the zone player 706 may send a return message indicating that it is operating in battery mode, and the zone player 706 may wait for another message from the zone player 708 before acting further.

In some embodiments, a zone player may receive multiple responses from more than one zone player after transmitting a probe message. In such a scenario, the zone player may be configured to make a selection as to which responding zone player should act as a network bridge for the zone player. For example, the zone player 708 may receive responses from both the zone player 702 and the zone player 706. The zone player 708 may be configured to determine from the responses that the zone player 702 is operating in the powered mode and that the zone player 706 is operating in the battery mode. From this determination, the zone player 708 may select the zone player 702 to act as a network bridge, since the zone player 702 is powered by an external power source and the zone player 706 is powered by an internal battery. Such a determination could, for example, conserve power. Other examples are also possible.

At block 854, the method 850 may involve, in response to the playback device receiving the message, causing the playback device to serve as a network bridge. In some embodiments, at least one processor of the zone player may cause the zone player to serve as a network bridge after receiving the message from another zone player even when the zone player is operating in the battery mode.

For example, referring back to FIG. 7B, after the zone player 706 received the message from the zone player 708 requesting to join the network, at least one processor of the zone player 706 may transition the zone player 706 from serving as a client device to serving as a network bridge. That is, although the zone player 706 is not powered from an external source, in response to the zone player 706 receiving the message from the zone player 708, the zone player 706 serves as a network bridge. Consequently, the power consumption of the zone player 706 may increase, but the zone player 708 may join the network, and the zone player 708 may receive data (e.g., audio data) from the zone player 706. At the end of the second point in time, the zone players 702-706 may serve as network bridges, while the zone player 708 may serve as a client device.

In some embodiments, a zone player may be operating in the battery mode, and the zone player may receive a request for the zone player to serve as a bridge. The zone player may be configured to transition to serve as a bridge based on a power level of the zone player's battery. For example, in one embodiment, the zone player may receive the request to serve as a bridge, determine that the power level of the zone player's battery is below a predefined threshold, and send a return response indicating that the zone player cannot serve as a bridge. In other embodiments, the zone player may receive the request to serve as a bridge, determine that the power level of the zone player's battery is at or above a predefined threshold, and cause the zone player to serve as a network bridge. Other examples are also possible.

FIG. 8C is a flowchart depicting an example method 855 for transitioning a networked playback device between operating modes. In some embodiments, the method 855 may be carried out after or in combination with the method 800 and/or the method 850.

At block 856, the method 855 may involve, while the playback device is serving as a network bridge, the playback device receiving a message from at least one additional playback device. For example, referring back to FIG. 7B, the zone player 706 may be serving as a network bridge for the zone player 708 (e.g., as a result of method 850 as described above), and the zone player 706 may receive a message from the zone player 708. In some embodiments, the message may indicate that the zone player 708 is leaving the network, that the zone player 708 is currently operating in the powered mode, or that the zone player 708 is switching to a different bridge, among other example messages.

At block 858, the method 855 may involve, in response to the playback device receiving the message, causing the playback device to operate as a client device. For example, referring back to FIG. 7B, the zone player 706 may receive the message from the zone player 708. The message may indicate that the zone player 708 no longer requires the zone player 706 to act as a bridge. In response, at least one processor of the zone player 706 may cause the zone player 706 to transition from serving as a network bridge to serving as a client device. By transitioning the zone player 706 from serving as a network bridge to serving as a client device, the zone player 706 may conserve power, which may be desirable within a network.

In some embodiments, the methods 800, 850, and/or 855 may further involve the playback device detecting a power level of the at least one battery (e.g., the at least one battery 430). For example, the at least one processor 408 may detect the power level of the at least one battery 430 of the zone player 400.

In some embodiments, once the power level is detected, the methods 800, 850, and 855 may further involve transmitting, by the playback device to at least one other networked device (e.g., one or more controllers and/or one or more zone players), a power-level message when the power level is below a predefined threshold. For example, referring back to FIG. 7B, at least one processor of the zone player 706 may detect a power level of at least one battery of the zone player 706 and determine that the power level is below a predefined threshold. The at least one processor may cause the zone player 706 to transmit a power-level message to at least one other networked device (e.g., the zone player 708) indicating that the zone player 706 has low battery power and the at least one other networked device may lose connectivity. In some embodiments, threshold data may be stored in memory 410, which may indicate the predefined threshold.

In certain embodiments, the power-level message sent by the zone player to the at least one other networked device may indicate a number of scenarios. For example, the zone player 706 may transmit the power-level message that may indicate to other network devices (e.g., the zone player 702, the zone player 708, a controller, etc.) that the zone player 706 has a low battery level, that the zone player 706 can no longer serve as an access point and/or a bridge, that the other network devices should find a new access point and/or bridge, etc. Other examples are certainly possible.

In some embodiments, the at least one other networked device that receives the power-level message may be configured to perform a function in response to the power-level message. For example, a zone player that receives the power-level message may find a different zone player to serve as a bridge, or a controller that receives the power-level message may find a different zone player to serve as an access point.

For example, referring back to FIG. 7B, the zone player 706 may be powered by an internal battery, and the zone player 706 may be serving as a bridge for the zone player 708. The zone player 706 may transmit a power-level message to a controller (e.g., a controller that the zone player 706 is acting as an access point for), and the power-level message may indicate that the zone player's battery level is low and that the zone player 708 may become unreachable on the network. In another example, the zone player 706 may transmit a power-level message to a second zone player (e.g., any of the zone players 702, 704, or 708), and the power-level message may indicate that the zone player 706 has a low battery level. Other examples are possible as well.

In some embodiments, a controller may display on a display screen a notification indicating that the battery level of a zone player (such as the zone player 706) is low. In other embodiments, the controller may display on a display screen a notification indicating that a zone player is about to lose connectivity, possibly because another zone player that is acting as a bridge for the zone player is about to stop acting as a bridge. For example, if the battery power of the zone player 706 is at or below a predefined threshold, and the zone player 708 will become unreachable on the network without using the zone player 706 as a bridge, then the controller may provide an indication of this event to the user.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application may allow a playback device to transition between operating modes to help conserve power, among other benefits. In one aspect, a method is provided. The method involves determining, by a playback device, that the playback device is operating in one of a powered mode and a battery mode. The powered mode comprises the playback device receiving power from an external source. The battery mode comprises the playback device receiving power from at least one battery. The method further involves causing the playback device to serve as a network bridge when the playback device is in the powered mode. The method further involves causing the playback device to (a) serve as a client device and (b) not serve as a network bridge when the playback device is in the battery mode.

In another aspect, a playback device is provided. The playback device includes at least one battery, a network interface, a non-transitory computer readable medium, and program instructions stored on the non-transitory computer readable medium. The program instructions are executable by at least one processor to cause the playback device to determine that the playback device is operating in one of a powered mode and a battery mode. The powered mode comprises the playback device receiving power from an external source. The battery mode comprises the playback device receiving power from the at least one battery. The program instructions are executable by the at least one processor to further cause the playback device to serve as a network bridge when operating in the powered mode. The program instructions are executable by the at least one processor to further cause the playback device to (a) serve as a client device and (b) not serve as a network bridge when operating in the battery mode.

In yet another aspect, a non-transitory computer readable medium is provided. The non-transitory computer readable medium having instructions stored thereon that are executable by at least one processor. The instructions include instructions for determining that a playback device is operating in one of a powered mode and a battery mode. The powered mode comprises the playback device receiving power from an external source. The battery mode comprises the playback device receiving power from at least one battery. The instructions further include instructions for causing the playback device to serve as a network bridge when the playback device is operating in the powered mode. The instructions further include instructions for causing the playback device to (a) serve as a client device and (b) not serve as a network bridge when the playback device is operating in the battery mode.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A first playback device comprising:
   a battery;
   a first communication interface configured to facilitate communication over a first data network;
   a second communication interface configured to facilitate communication over a second data network;
   at least one audio amplifier;
   at least one processor;
   at least one non-transitory computer-readable medium; and
   program instructions stored on the at least one non-transitory computer-readable medium that are executable by the at least one processor such that the first playback device is configured to:
      based on a battery status of the battery, operate in a first mode wherein the first playback device is configured to transmit audio content to each other playback device in a group including the first playback device and at least a second playback device for synchronous playback with the first playback device;
      begin transmitting at least a first portion of given audio content to at least the second playback device over the first data network;

while transmitting the first portion of the given audio content to at least the second playback device, determine a change to the battery status; and based on the change to the battery status, (i) transition from operating in the first mode to operating in a second mode wherein the first playback device is not configured to transmit audio content to each other playback device in the group and (ii) stop transmitting the first portion of the given audio content to at least the second playback device.

2. The first playback device of claim 1, wherein the battery status indicates that the battery is receiving power from an external source, and wherein the change to the battery status indicates that the battery is no longer receiving power from the external source.

3. The first playback device of claim 1, wherein the battery status indicates that the battery is above a threshold level, and wherein the change to the battery status indicates that the battery has fallen below the threshold level.

4. The first playback device of claim 1, further comprising program instructions stored on the at least one non-transitory computer-readable medium that are executable by the at least one processor such that the first playback device is configured to:
using the at least one audio amplifier, play back the given audio content in synchrony with at least the second playback device.

5. The first playback device of claim 1, wherein the program instructions that are executable by the at least one processor such that the first playback device is configured to begin transmitting at least the first portion of the given audio content to at least the second playback device over the first data network comprise program instructions that are executable by the at least one processor such that the first playback device is configured to:
begin transmitting at least the first portion of the given audio content to at least the second playback device and a third playback device for synchronous playback with the first playback device.

6. The first playback device of claim 5, further comprising program instructions stored on the at least one non-transitory computer-readable medium that are executable by the at least one processor such that the first playback device is configured to:
using the at least one audio amplifier, play back the given audio content in synchrony with the second and third playback devices.

7. The first playback device of claim 1, further comprising program instructions stored on the at least one non-transitory computer-readable medium that are executable by the at least one processor such that the first playback device is configured to:
before transmitting the first portion of the given audio content to at least the second playback device, obtain at least the first portion of the given audio content from a network device.

8. The first playback device of claim 1, further comprising program instructions stored on the at least one non-transitory computer-readable medium that are executable by the at least one processor such that the first playback device is configured to:
after transitioning from the first mode to the second mode, continue playing back the given audio content in synchrony with at least the second playback device.

9. The first playback device of claim 1, further comprising program instructions stored on the at least one non-transitory computer-readable medium that are executable by the at least one processor such that the first playback device is configured to:
determine a respective battery status of the second playback device; and based on the respective battery status of the second playback device, cause the second playback device to begin operating in the first mode, wherein the second playback device is configured to transmit audio content to the first playback device.

10. The first playback device of claim 9, wherein the program instructions that are executable by the at least one processor such that the first playback device is configured to cause the second playback device to begin operating in the first mode comprise program instructions that are executable by the at least one processor such that the first playback device is configured to:
transmit a message to the second playback device indicating that the second playback device is to obtain at least a second portion of the given audio content from a network device for transmission to the first playback device.

11. The first playback device of claim 9, further comprising program instructions stored on the at least one non-transitory computer-readable medium that are executable by the at least one processor such that the first playback device is configured to:
begin receiving at least a second portion of the given audio content from the second playback device.

12. The first playback device of claim 1, further comprising program instructions stored on the at least one non-transitory computer-readable medium that are executable by the at least one processor such that the first playback device is configured to:
while operating in the second mode, determine a change in a respective battery status of the second playback device;

based on the change to the respective battery status of the second playback device, transition from operating in the second mode to the first mode; and begin transmitting at least a second portion of the given audio content to the second playback device over the second data network.

13. The first playback device of claim 12, wherein the respective battery status of the second playback device indicates that (i) a battery of the second playback device is no longer connected to an external power source and (ii) a battery level of the second playback device is below a threshold level, and wherein the battery status of the first playback device indicates that a battery level of the first playback device is above the threshold level.

14. At least one non-transitory computer-readable medium, wherein
the at least one non-transitory computer-readable medium is provisioned with program instructions that, when executed by at least one processor, cause a first playback device to:
based on a battery status of a battery of the first playback device, operate in a first mode wherein the first playback device is configured to transmit audio content to each other playback device in a group including the first playback device and at least a second playback device for synchronous playback with the first playback device;

begin transmitting at least a first portion of given audio content to at least the second playback device over a first data network;

while transmitting the first portion of the given audio content to at least the second playback device, determine a change to the battery status; and based on the change to the battery status, (i) transition from operating in the first mode to operating in a second mode wherein the first playback device is not configured to transmit audio content to each other playback device in the group and (ii) stop transmitting the first portion of the given audio content to at least the second playback device.

15. The at least one non-transitory computer-readable medium of claim 14, wherein the battery status indicates that the battery is receiving power from an external source, and wherein the change to the battery status indicates that the battery is no longer receiving power from the external source.

16. The at least one non-transitory computer-readable medium of claim 14, wherein the battery status indicates that the battery is above a threshold level, and wherein the change to the battery status indicates that the battery has fallen below the threshold level.

17. The at least one non-transitory computer-readable medium of claim 14, wherein the at least one non-transitory computer-readable medium is also provisioned with program instructions that, when executed by at least one processor, cause the first playback device to:

using at least one audio amplifier, play back the given audio content in synchrony with at least the second playback device.

18. A method carried out by a first playback device, the method comprising:

based on a battery status of a battery of the first playback device, operating in a first mode wherein the first playback device is configured to transmit audio content to each other playback device in a group including the first playback device and at least a second playback device for synchronous playback with the first playback device;

begin transmitting at least a first portion of given audio content to at least the second playback device over a first data network;

while transmitting the first portion of the given audio content to at least the second playback device, determining a change to the battery status; and based on the change to the battery status, (i) transitioning from operating in the first mode to operating in a second mode wherein the first playback device is not configured to transmit audio content to each other playback device in the group and (ii) stop transmitting the first portion of the given audio content to at least the second playback device.

19. The method of claim 18, wherein the battery status indicates that the battery is above a threshold level, and wherein the change to the battery status indicates that the battery has fallen below the threshold level.

20. The method of claim 18, wherein the battery status indicates that the battery is receiving power from an external source, and wherein the change to the battery status indicates that the battery is no longer receiving power from the external source.

* * * * *